March 2, 1948.   P. L. A. VERGNE   2,436,947
OVERLOAD RELEASE CLUTCH
Filed Feb. 2, 1945   2 Sheets-Sheet 1

INVENTOR
PIERRE LOUIS ANDRE VERGNE
ATTORNEY

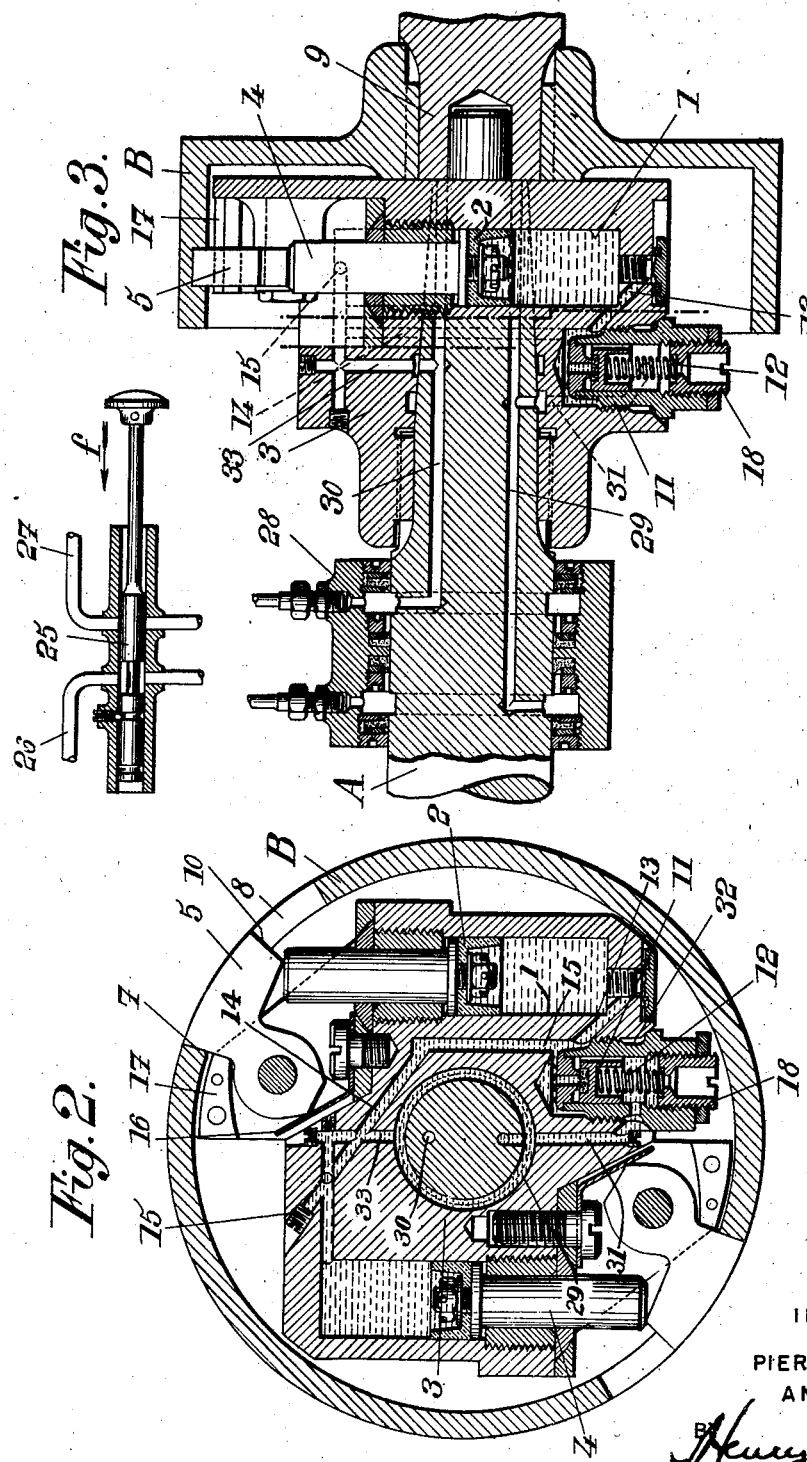

Patented Mar. 2, 1948

2,436,947

UNITED STATES PATENT OFFICE 2,436,947

OVERLOAD RELEASE CLUTCH

Pierre Louis André Vergne, Saint-Cloud, France, assignor to Société "Elox," Courbevoie, France, a society of France Application February 2, 1945, Serial No. 575,862
In France November 23, 1943

11 Claims. (Cl. 192—56)

The present invention relates to dynamometric devices of the kind used for measuring, adjusting or limiting the effort applied to a part or system of parts, and in particular to a shaft or other rotary element. It is more especially, although not exclusively, concerned, among these devices, with those to be interposed between two rotary members for producing an automatic disengagement (or any other desired action) as soon as the torque transmitted from one of these members to the other exceeds a given value.

The chief object of this invention is to provide a device of the type above described which is better adapted to meet the requirements of practice than those used for the same purpose up to the present time and, in particular, which is simpler and easier to adjust.

Other objects of my invention will appear from the following detailed description of some specific embodiments thereof.

Preferred embodiments of the present invention will be hereinafter described with reference to the accompanying drawings, given merely by way of example, and in which:

Fig. 2 is a transverse sectional view of another embodiment of a device of the same kind made according to second embodiment of the invention, with means for controlling from a distance the reengagement of the parts;

Fig. 3 is an axial sectional view corresponding to Fig. 2.

Figure 1:
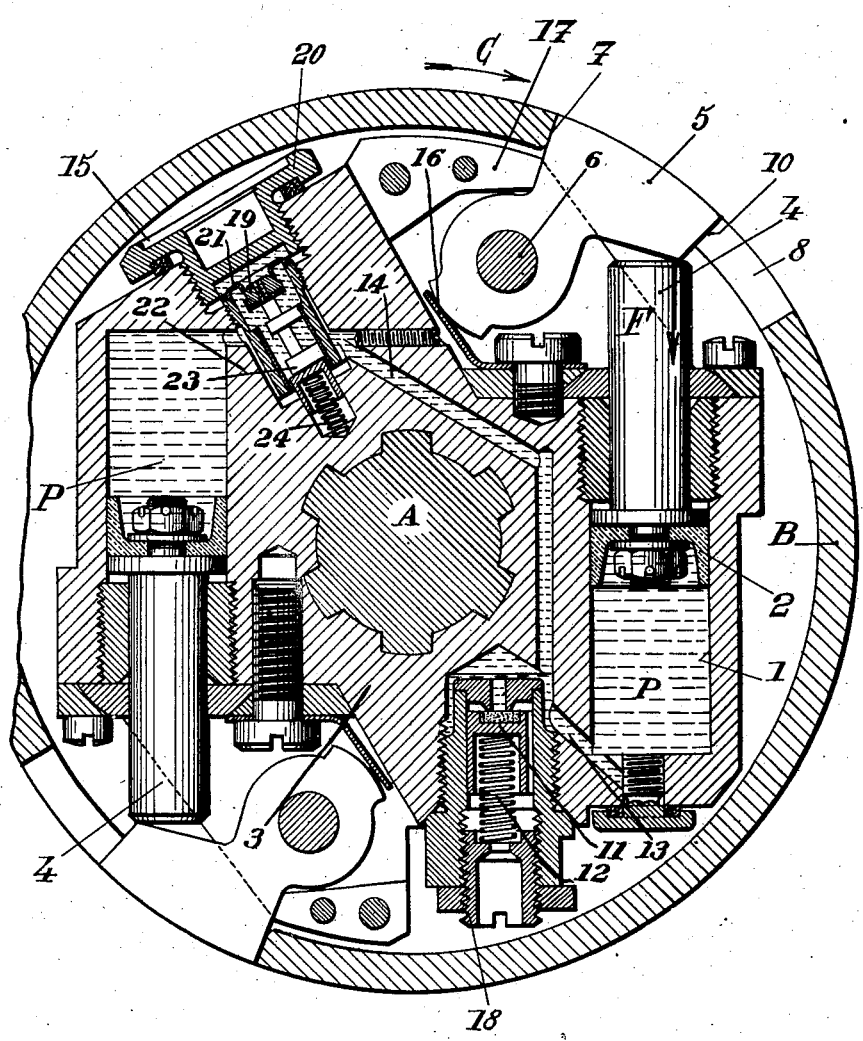
Fig. 1 is a sectional view, transverse to the axis of the device, of automatic disengagement means made according to a first embodiment of the present invention.

In the following description, it will be supposed, by way of example that the two parts or members to be driven one by the other are two shafts, or other rotary elements, such as A and B, disposed coaxially in line with each other.

According to the embodiments of my invention shown by the drawing, the device includes:

a. On the one hand, one or several groups including each a cylinder 1 and a piston 2, these groups being carried by a disc 3 fixed on one of the shafts, to wit A (which is supposed in this case to be the driven shaft);

b. On the other hand, for transmitting to pistons 2, or to the rods 4 of these pistons, an effort F which is a function of torque C; clutch means consisting for instance of pawls or cams 5 pivoted at 6 to disc 3 and to each of which the torque C is transmitted at 7. This torque is imparted by an element rigid with the driving part or member of the device, for instance by the edge of a notch 8 provided in member B. In this example, member B is supposed to be constituted by an annular part carried by a driving shaft or other rotary member (for instance a shaft 9 as shown by Fig. 3). The portion 10 of pawl 5 serves to transmit effort F to the rod 4 of piston 2; and, finally, c. One or several discharge means adapted to open only when the limit pressure has been reached. These means are for instance constituted by a valve 11 subjected to the action of a spring 12 and which coacts with conduits 14, 15 and 13 leading to cylinders 1. The whole is arranged in such manner that, when the pressure P existing in said cylinders exceeds a given value, this valve opens and allows the liquid to escape either into a suitable casing provided around the device or toward a return conduit, as it will be more specifically described with reference to Figs. 2 and 3.

With such an arrangement, if the outline of cams or claws 5 has been suitably determined, so that these cams or pawls can retract inside annular member B when torque C reaches its limit value and causes the liquid to be discharged through valve 11, a disengagement of parts A and B is obtained, since the edges 7 of the notches provided in annular member B no longer transmit any movement to the corresponding portions of said cams or pawls.

Under normal working conditions, the cams or pawls may be urged by elastic means toward their positions of engagement with said edges 7. Said elastic means are, in the embodiment illustrated by the drawing, constituted by a spring 16 which tends to bring the cams or pawls into contact with an abutment 17.

Furthermore, means may be provided for permitting the adjustment of the value of the limit torque to be transmitted. These means operate by varying the reaction opposed to the opening of valve 11. In the embodiment illustrated they are therefore means for adjusting the strength of spring 12, and are for instance constituted by an adjustable abutment 18 for said spring.

It must also be possible, after the parts or members A and B have been disconnected, to refill cylinders 1 with liquid so as to permit of bringing back into its initial state, in which said parts are driven one by the other.

The refilling of cylinders 1 with liquid can be performed: either through manually operated means provided on the device itself; or through means operable from a distance, and which may eventually be automatic.

In Fig. 1, I have shown a device for the filling of the cylinders and carried by disc 3. This filling device is constituted by filling check valve 19 adapted, once plug 20 has been removed, to be opened by the end of a syringe or equivalent instrument inserted into an orifice such as 21. The liquid from said filling instrument is thus forced into a body 22 in communication with conduits 14 and 15. Check valve 19, guided at 23, is subjected to the action of a spring 24 which automatically closes it as soon as the end of the syringe or equivalent instrument is withdrawn.

Figs. 2 and 3 show another embodiment of the invention in which the discharge and filling means are operable from a distance. Said means include a distributing element, constituted by a slide valve 25, controlling two conduits 26 and 27 serving respectively to the discharge and the feed of liquid. This liquid is, for instance supplied by the lubricating oil system.

It results from the drawings that, in the position of distributing member 25 that is illustrated by Fig. 3, the liquid can be freely discharged, when the maximum torque is reached, through conduits 29, 31 and 26.

In order to reengage the parts into their initial position, the distributing member is displaced in such manner as to close the discharge conduit and to permit the feed of fresh liquid through conduit 27 into conduits 30 and 33 and, consequently, into the cylinders 1 of the device.

It should be well understood that I might combine with a device such as that just above described means for causing the liquid to play a part different from that above set forth, and eventually a supplementary part, for instance that of facilitating the starting of the whole. For this purpose, in order to avoid too sudden a starting of the driven parts, I may provide in the body of the apparatus elastic means such as an air cushion capable of absorbing shocks owing to the possibility of slight relative displacement of pistons 2 for short time periods.

Finally, it is clear that several devices such as above described may be combined together, provided that the pressures in the respective cylinders are balanced by the provision of interconnecting conduits extending between said devices.

Anyway, whatever be the particular embodiment that is chosen, I obtain a device the operation of which results sufficiently clearly from the preceding description for making it unnecessary to enter into further explanations.

This device has, over those employed for the same purpose prior to the present invention, many advantages among which the following are believed to be particularly interesting:

The device according to this invention permits an easy adjustment of the limit effort to be supported by the parts;

It includes only simple elements which can easily be replaced when necessary.

Such a device is adapted to a great number of different applications. It may be used, for instance, as a torque limiting device or an automatic disconnecting device for use in connection with machine-tools or other apparatus.

It may also be used for adjusting the resisting torque applied to engine shafts, for instance propeller shafts.

The device according to the present invention can also be used when it is desired, not to disconnect two rotary members normally driven one by the other, but to adjust the relative angular positions of these two members in accordance, for instance, with the efforts supported by one of them. For instance, the device according to the invention can be used for ensuring the automatic pitch variation of propellers. In this case, an increase of the resisting effort beyond a given value causes pistons 2 to be pushed back until a new position is reached, which corresponds to another pitch of the propeller and corresponds to a new balance of action and reaction.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A device of the type described which comprises, in combination, two coaxial rotary members adapted to be driven one by the other, at least one clutch pawl movably carried by one of said members for coupling it with the other, said pawl being pivoted to said first mentioned member about an axis parallel to the rotation axis thereof so that, in its position of engagement with said second mentioned member, it is urged toward its disengaged position by the torque transmitted through itself from one member to the other, an abutment carried by said first mentioned member for limiting the rotation of said pawl about its axis to its position of engagement with said second mentioned member, spring means for urging said pawl toward said abutment, a hydraulic jack including a cylinder carried by said first mentioned member at right angles to said rotation axis, a piston slidable in said cylinder, and a rod carried by said piston and in contact with said pawl, said rod being adapted, in the expanded position of said jack to cooperate with said pawl for holding it in engaged position while transmitting, in series therewith, the torque thrust from one member to the other, and a loaded discharge valve for said jack carried by said first mentioned member adapted to open in response to a rise of the liquid pressure in said cylinder above a given value, thus permitting said pawl to be forced into disengaged position by any torque to be transmitted therethrough that exceeds a given value.

2. A device of the type described which comprises, in combination, two coaxial rotary members adapted to be driven one by the other, at least two mechanical clutch means movably carried by one of said members for coupling it with the other, said clutch means being so mounted on said first mentioned member that, in their position of engagement with said second mentioned member, they are urged toward their disengaged position by the torque transmitted through them from one member to the other, at least two fluid jack means including each at least one cylinder rigid with said first mentioned member and at least one piston slidable in said cylinder, said piston being adapted, in the expanded position of said jack means, to cooperate with one of said clutch means respectively for holding said clutch means in engaged position while transmitting, in series therewith, the torque thrust from one member to the other, means carried by said first mentioned member forming a hollow chamber in communication with said jack means cylinders and also filled with liquid, a loaded discharge valve for said chamber carried by said first mentioned member adapted to open in response to a rise of the liquid pressure in said cylinders and chamber above a given value, thus permitting said clutch means to be forced into disengaged position by any torque to be transmitted that exceeds a given value, and check valve means in communication with said cylinders, carried by said first mentioned member, for the refilling of said cylinders after a discharge of liquid therefrom, whereby said clutch means can be restored into engagement with said second mentioned member.

3. A device of the type described which comprises, in combination, two coaxial rotary members adapted to be driven one by the other, mechanical clutch means movably carried by one of said members for coupling it with the other, said clutch means being so mounted on said first mentioned member that, in their position of engagement with said second mentioned member, they are urged toward their disengaged position by the torque transmitted through them from one member to the other, hydraulic jack means including at least one cylinder carried by said first mentioned member and at least one piston slidable in said cylinder, said piston being adapted, in the expanded position of said jack means, to cooperate with said clutch means for holding them in engaged position while transmitting, in series therewith, the torque thrust from one member to the other, a loaded discharge valve for said jack means carried by said first mentioned member adapted to open in response to a rise of the liquid pressure in said cylinder above a given value, thus permitting said clutch means to be forced into disengaged position by any torque to be transmitted that exceeds a given value, a discharge conduit carried by said first mentioned member and in communication with the output side of said valve, a conduit adapted to be connected with a source of liquid under pressure carried by said first mentioned member and in communication with said cylinder, and distributing means for alternately cutting off one of said conduits and opening the other.

4. A device of the type described which comprises, in combination, two coaxial rotary members adapted to be driven one by the other, at least two mechanical clutch means movably carried by one of said members for coupling it with the other, said clutch means being so mounted on said first mentioned member that, in their position of engagement with said second mentioned member, they are urged toward their disengaged position by the torque transmitted through them from one member to the other, at least two fluid jack means including each at least one cylinder rigid with said first mentioned member and at least one piston slidable in said cylinder, said piston being adapted, in the expanded position of said jack means, to cooperate with one of said clutch means respectively for holding said clutch means in engaged position while transmitting, in series therewith, the torque thrust from one member to the other, means carried by said first mentioned member forming a hollow chamber in communication with said jack means cylinders and also filled with liquid, a loaded discharge valve for said chamber carried by said first mentioned member adapted to open in response to a rise of the liquid pressure in said cylinders and chamber above a given value, thus permitting said clutch means to be forced into disengaged position by any torque to be transmitted that exceeds a given value, a discharge conduit carried by said first mentioned member and in communication with the output side of said valve, a conduit adapted to be connected with a source of liquid under pressure carried by said first mentioned member and in communication with said cylinders, and distributing means for alternately cutting off one of said conduits and opening the other.

5. A device of the type described which comprises, in combination, two coaxial rotary members adapted to be driven one by the other, at least one clutch claw movably carried by one of said members for coupling it with the other, said claw being pivoted to said first mentioned member about an axis parallel to the rotation axis thereof so that, in its position of engagement with said second mentioned member, it is urged toward its disengaged position by the torque transmitted through itself from one member to the other, a hydraulic jack including a cylinder carried by said first mentioned member at right angles to said rotation axis, a piston slidable in said cylinder, and a rod carried by said piston and in contact with said claw, said rod being adapted, in the expanded position of said jack, to cooperate with said claw for holding it in engaged position while transmitting, in series therewith, the torque thrust from one member to the other, a loaded discharge valve for said jack carried by said first mentioned member adapted to open in response to a rise of the liquid pressure in said cylinder above a given value, thus permitting said claw to be forced into disengaged position by any torque to be transmitted therethrough that exceeds a given value, a discharge conduit carried by said first mentioned member and in communication with the output side of said valve, a conduit adapted to be connected with a source of liquid under pressure carried by said first mentioned member and in communication with said cylinder, and distributing means for alternately cutting off one of said conduits and opening the other.

6. A device of the type described which comprises, in combination, two coaxial rotary members adapted to be driven one by the other, at least two clutch claws movably carried by one of said members for coupling it with the other, each of said claws being pivoted to said first mentioned member about an axis parallel to the rotation axis thereof so that, in its position of engagement with said second mentioned member, it is urged toward its disengaged position by the torque transmitted through itself from one member to the other, at least two hydraulic jacks including each a cylinder carried by said first mentioned member at right angles to said rotation axis, a piston slidable in said cylinder, and a rod carried by said piston and in contact with one of said claws respectively, said rod being adapted, in the expanded position of said jack, to cooperate with the corresponding claw for holding it in engaged position while transmitting, in series therewith, the torque thrust from one member to the other, means carried by said first mentioned member forming a hollow chamber in communication with said jack cylinders and also full of liquid, a spring-loaded discharge valve for said chamber carried by said first mentioned member adapted to open in response to a rise of the liquid pressure in said cylinders and chamber above a given value, thus permitting said claw to be forced into disengaged position by any torque to be transmitted therethrough that exceeds a given value, a discharge conduit carried by said first mentioned member and in communication with the output side of said valve, a conduit adapted to be connected with a source of liquid under pressure carried by said first mentioned member and in communication with said cylinders, and distributing means for alternately cutting off one of said conduits and opening the other.

7. A device of the type described which comprises, in combination, two coaxial rotary members adapted to be driven one by the other, cooperating mechanical clutch elements carried by said members respectively, one of said clutch elements being movably carried by the corresponding rotary member transversely to the axis thereof so as to be retractable with respect to the path of travel of the other clutch element and being adapted to be urged toward its retracted position by the effort transmitted thereto by the other clutch element, a hydraulic jack including a cylinder carried at right angles to said axis by the same rotary member as above mentioned, a piston slidable in said cylinder and a rod carried by said piston adapted, in the expanded position of said jack to cooperate with the first mentioned clutch element for keeping it in working contact with the other clutch element, and a loaded discharge valve for said jack adapted to open in response to a rise of the liquid pressure in said cylinder above a given value.

8. A device of the type described which comprises, in combination, two coaxial rotary members adapted to be driven one by the other, cooperating mechanical clutch elements carried by said members respectively, one of said clutch elements consisting of a pawl pivoted to the corresponding rotary member about an axis parallel to the rotation axis thereof so as to be retractable with respect to the path of travel of the other clutch element and being adapted to be urged toward its retracted position by the effort transmitted thereto by the other clutch element, a hydraulic jack including a cylinder carried at right angles to said axis by the same rotary member as above mentioned, a piston slidable in said cylinder and a rod carried by said piston adapted, in the expanded position of said jack to cooperate with the first mentioned clutch element for keeping it in working contact with the other clutch element, and a loaded discharge valve for said jack adapted to open in response to a rise of the liquid pressure in said cylinder above a given value.

9. A device of the type described which comprises, in combination, two coaxial rotary members adapted to be driven one by the other, cooperating mechanical clutch elements carried by said members respectively, one of said clutch elements being movably carried by the corresponding rotary member transversely to the axis thereof so as to be retractable with respect to the path of travel of the other clutch element and being adapted to be urged toward its retracted position by the effort transmitted thereto by the other clutch element, a hydraulic jack including a cylinder carried at right angles to said axis by the same rotary member as above mentioned, a piston slidable in said cylinder and a rod carried by said piston adapted, in the expanded position of said jack to cooperate with the first mentioned clutch element for keeping it in working contact with the other clutch element, a loaded discharge valve for said jack adapted to open in response to a rise of the liquid pressure in said cylinder above a given value, and means for adjusting the load of said discharge valve.

10. A device of the type described which comprises, in combination, two coaxial rotary members adapted to be driven one by the other, cooperating mechanical clutch elements carried by said members respectively, one of said clutch elements consisting of a pawl pivoted to the corresponding rotary member about an axis parallel to the rotation axis thereof so as to be retractable with respect to the path of travel of the other clutch element and being adapted to be urged toward its retracted position by the effort transmitted thereto by the other clutch element, a hydraulic jack including a cylinder carried at right angles to said axis by the same rotary member as above mentioned, a piston slidable in said cylinder and a rod carried by said piston adapted, in the expanded position of said jack to cooperate with the first mentioned clutch element for keeping it in working contact with the other clutch element, a loaded discharge valve for said jack adapted to open in response to a rise of the liquid pressure in said cylinder above a given value, and means for adjusting the load of said discharge valve.

11. A device of the type described which comprises, in combination, two coaxial rotary members adapted to be driven one by the other, cooperating mechanical clutch elements carried by said members respectively, one of said clutch elements being movably carried by the corresponding rotary member transversely to the axis thereof so as to be retractable with respect to the path of travel of the other clutch element and being adapted to be urged toward its retracted position by the effort transmitted thereto by the other clutch element, an abutment carried by the same rotary member for limiting the displacement of said first mentioned clutch element in the direction corresponding to its projecting across the path of travel of the second mentioned clutch element, spring means for urging the first mentioned clutch element toward said abutment, a hydraulic jack including a cylinder carried at right angles to said axis by the same rotary member as above mentioned, a piston slidable in said cylinder and a rod carried by said piston adapted, in the expanded position of said jack to cooperate with the first mentioned clutch element for keeping it in working contact with the other clutch element, and a loaded discharge valve for said jack adapted to open in response to a rise of the liquid pressure in said cylinder above a given value.

PIERRE LOUIS ANDRÉ VERGNE.

REFERENCES CITED

The following references are of record in the file of this patent:

UNITED STATES PATENTS

| Number | Name | Date |
| --- | --- | --- |
| 1,388,311 | Russell | Aug. 23, 1921 |
| 1,485,987 | Manwaring | Mar. 4, 1924 |
| 1,506,846 | Lovejoy | Sept. 2, 1924 |
| 1,797,407 | Everstam | Mar. 24, 1931 |
| 1,919,437 | LeFevre | July 25, 1933 |
| 2,293,786 | Worden | Aug. 25, 1942 |
| 2,293,787 | Worden | Aug. 25, 1942 |